United States Patent [19]

Perminov

[11] 3,738,148

[45] June 12, 1973

[54] DIE AND METHOD OF MAKING THE SAME

[76] Inventor: Evgeny Mikhailovich Perminov, Angarskaya, 26, Korpus I, kv. 10, Minsk, U.S.S.R.

[22] Filed: Aug. 14, 1970

[21] Appl. No.: 63,786

[52] U.S. Cl. .................. 72/362, 29/505, 72/413
[51] Int. Cl. ............................. B21j 13/02
[58] Field of Search ............. 72/75, 412, 413, 72/414, 481, 362; 76/107 R; 29/148.4 C, 432, 432.2, 505

[56] References Cited
UNITED STATES PATENTS

| | | | |
|---|---|---|---|
| 1,707,400 | 4/1929 | Kerruish | 113/116 |
| 3,638,474 | 2/1972 | Hannaford | 72/476 |
| 1,106,564 | 8/1914 | Hoffmann | 72/481 |
| 1,596,393 | 8/1926 | Bowne | 72/413 |
| 1,458,599 | 6/1923 | Stafford | 76/107 |
| 2,622,272 | 12/1952 | Haring et al. | 29/505 |
| 2,622,271 | 12/1952 | Gent et al. | 29/505 |

*Primary Examiner*—Lowell A. Larson
*Attorney*—Holman & Stern

[57] ABSTRACT

Technological tooling in which a die comprises a female die member provided with similar spherical hollows uniformly distributed along a circumference and removable balls placed into the hollows, with the balls having a radius equal to that of the hollows.

The die is made by embossing spherical hollows by means of the balls placed into prefabricated centering recesses between two coaxial blanks of the female dies which are subjected to axial squeezing in several stages, in which case the blanks are turned relative to each other through an angle between two adjacent recesses.

The die is designed primarily for making ball-type indexing devices.

2 Claims, 6 Drawing Figures

3,738,148

DIE AND METHOD OF MAKING THE SAME

BACKGROUND OF THE INVENTION

The present invention relates to technological tooling and, more particularly, to a die for embossing spherical reliefs on flat surfaces of machine members and also to a method of making such a die.

The dies can be most successively used for making thereon components of ball indexing devices, ball couplings and components of drives with a ball-type engagement. The indexing devices which can be made on the die comprise at least two coaxial disks, one of which, an indexing disk, is provided with spherical hollows extending along a circumference, while the other, a fixing disk, carries balls having a radius equal to that of the hollows. The balls occupy the hollows of the indexing disk.

The accuracy of the angular division of such indexing devices depends solely on the accuracy of manufacture of the indexing and fixing disks.

If conventional metal-working equipment is used, the process of making the spherical hollows and projections on the disks with a required accuracy is associated with considerable difficulties.

An object of the present invention is to eliminate the above mentioned disadvantages.

SUMMARY OF THE INVENTION

The basic object of the invention is to provide a technological tooling for making spherical reliefs on flat surfaces with a high accuracy and without additional finishing operations and also a method of making such a technological tooling.

This object is attained by means of the embossing die in which the female die member has recesses for working tools, and according to the invention, these recesses are made in the form of similar spherical hollows uniformly distributed along a single circumference on the flat surface of the female die, with the distance between two adjacent hollows being equal to or a multiple of a double radius of their sphere. The working tool consists of removable balls whose sphere has a radius equal to that of the hollows.

It is expedient that the depth of the hollows be less than the radius of their sphere whereby it is possible to use the same die both for making members with spherical hollows (indexing disks) and members with spherical projections (fixing disks) with the same degree of accuracy.

The method of making the die provide for the formation of recesses for the working tool on the flat surface of the female die in which recesses are preliminarily formed on the flat surfaces of two blanks of the female dies. Then, the blanks are placed coaxially, with the flat surfaces facing one another and the balls are placed into the recesses therebetween. In such a position, the blanks of the female dies are subjected to axial pressure several times and after each pressure action, the blanks are turned relative to each other through an angle multiple of the distance between two adjacent recesses.

Other objects and advantages of the invention will be apparent from the following description of an embodiment of the invention reference being made to the accompanying drawings, in which:

DETAILED DESCRIPTION OF THE INVENTION

Figure 1:
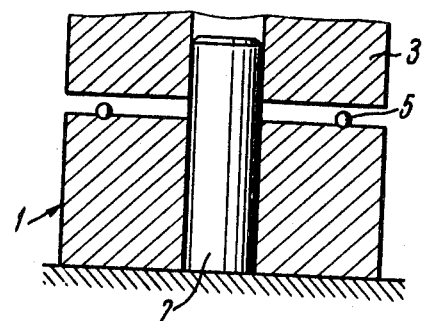
FIG. 1 is a view partly in side elevation and partly in cross section of the die for making members of ball indexing devices.

The die for making indexing and fixing disks for ball indexing devices, according to the invention, consists of a cylindrical female die 1 (FIG. 1) having in the center thereof a guide column 2 for receiving a male die 3 for applying a stamping force on the blank of an article being made.

Figure 2:
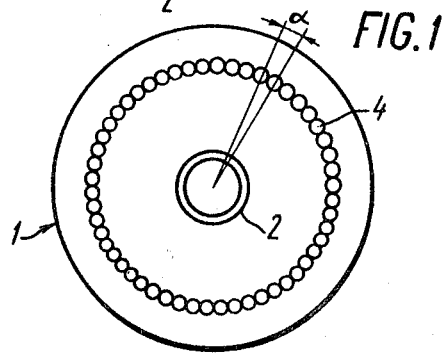
FIG. 2 is the same (a top view of the female die member)

Arranged along a circumference on upper flat surface 1' of the female die 1 are spherical hollows or depressions 4 (FIG. 2) of the same radius. The distance between two adjacent hollows 4 is equal to two radii of their sphere while the depth of the hollows 4 is less than this radius. The working tool of the die consists of conventional balls 5. The radius of the sphere of the balls 5 is equal to the radius of the hollows 4 so that that the balls are easily positioned into the hollows in a required amount and in a predetermined order.

The present method of making the above-described ball die, provides for embossing the spherical hollows 4 simultaneously in two similar blanks 1a (FIG. 3) and 1b of the female dies having axial cylindrical through holes 1c and 1d for mounting the blanks on a guide column 2a. The shaping tool consists of balls 5.

The method is effected as follows:

The flat work surfaces of the two cylindrical blanks 1a and 1b are provided with centering recesses 6a and 6b applied along a circumference of a predetermined diameter, with the radius of the recesses being less than the radius of the balls 5. The distance between the center of two adjacent recesses 6a and 6b is chosen depending on the angular pitch α (FIG. 2) of the die.

In the example considered, this distance is equal to two radii of the balls 5. Then, one of the blanks namely the blank 1a is set on the guide column 2a and the balls 5 of a single selected radius are positioned into all the recesses 6a of the blank. The other blank 1b is installed on the column 2a from above so that its flat surface with the centering recesses 6b is above the flat surface of the lower blank 1a, while its centering recesses 6b are located on the balls 5 positioned the recesses 6a of the first blank 1a.

Figure 3:
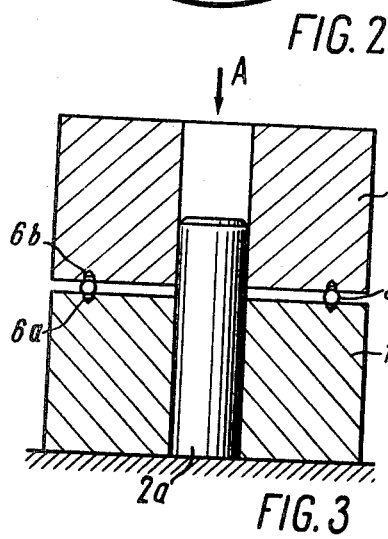
FIG. 3 is a view similar to FIG. 1 of the assembled pack of two blanks of the female members of the die prior to forming spherical hollows therein.
Figure 4:
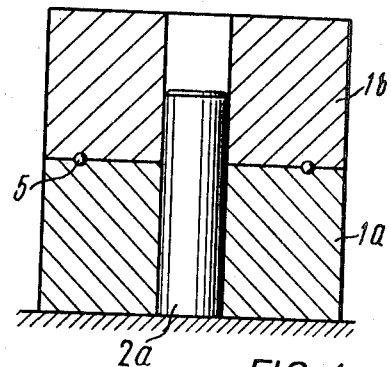
FIG. 4 is a view similar to FIG. 3 at the end of the process of forming the hollows.

The thus assembled pack of the two blanks 1a and 1b with the balls 5 disposed therebetween in the recesses 6a and 6b is installed on a press and is subjected to axial pressure in several operations (the direction of the pressure force is shown by arrow A in FIG. 3). After each pressure operation, the load is released, the upper blank 1b is raised a little and, after turning the upper blank through the angle between two adjacent recesses 6a (6b), the blanks 1a and 1b are pressed again, with the pressure force being increased during each subsequent operation until the blanks 1a and 1b are closed as shown in FIG. 4.

The impressions of the balls 5 formed in the recesses 6a and 6b of the blanks 1a and 1b are transformed into spherical hollows 4 as the pressure increases.

After this latter operation, the flat surfaces of the two blanks 1a and 1b are ground simultaneously so as to obtain a predetermined length of the hollows 4. Following the finish, the female dies are subject to heat treatment.

Thus, two precisely similar female dies are produced and each of which can be used for embossing new hollows.

The embossing of the hollows in the female dies can be made with a maximum required force of the press. In this case, replaceable thrust spacers are placed between the blanks of the female dies, with the spacers being replaced with thinner ones after each pressure operation.

The operation of the die is further disclosed by an example of making indexing and fixing disks of a ball indexing device.

Figure 5:
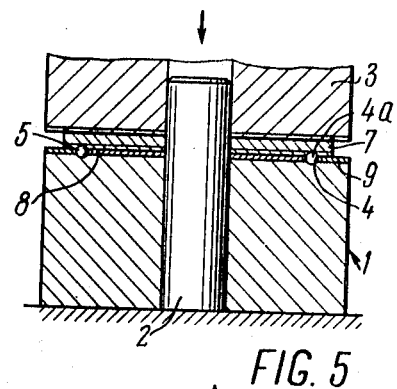
FIG. 5 is a view similar to FIG. 1 of the die with an indexing disk made thereon.

The embossing of spherical hollows in the indexing disk is as follows:

The balls 5 are placed in a prescribed order into the hollows 4 of the female die 1 (FIG. 5), and thereafter, blank 7 of the indexing disk is positioned on the balls while centering the disk by the adjusting column 2. The force of the press acts upon the blank 7 of the disk through the male member 3 of the die and presses the blank to limiting spacers 8 and 9 controlling the depth of hollows 4a formed in the blank 7 due to plastic deformation of the material of the blank 7 in the places of contact of the blank with the balls 5.

Figure 6:
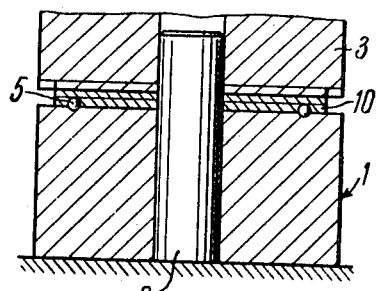
FIG. 6 is a view similar to FIG. 1 of the die with a fixing disk made thereon.

In the depth of penetration (pressing-in) of the balls 5 into blank 10 (FIG. 6) of the disk exceeds their radius, the balls 5 are rigidly squeezed by the material of the blank 10 of the disk and, after removing it from the female die 1, the balls 5 remain pressed-in within the disk, i.e. a fixing disk of an indexing device is obtained.

Thus, the same die, according to the invention, can be used both for making components with spherical hollows and components with spherical projections, while providing a high accuracy of the making and disposition of these components on flat surfaces of machine members. The embossing die features a simple process of its manufacture and provides a simple process of manufacture of components with the help of such die.

I claim:

1. A die for forming spherical recesses and projections on flat surfaces of machine members comprising in combination: a female die member having a flat surface, said flat surface having a recesses for a working tool consisting of similar spherical hollows uniformly disposed along a common circumference at similar distances equal to or a multiple of two radii of the sphere of said hollows, and removable balls having a radius equal to that of said spherical hollows in which the balls are placed, the depth of the spherical hollows being less than the radius of their sphere to insure tight fastening of the balls, with said balls serving as the working tool of said die.

2. A method of making a die for forming spherical hollows and projections on flat surfaces of machine members comprising the steps of uniformly arranging centering recesses on the flat surface of two blanks of female dies along a common circumference, positioning said blanks coaxially with the flat surfaces thereof facing each other placing balls in said recesses between said blanks, subjecting said blanks to mutual axial squeezing in several operations, and turning said blanks relative to each other through an angle multiple of the angle between two adjacent recesses after each squeezing operation.

* * * * *